US008687971B2

(12) United States Patent
Dahlfort (10) Patent No.: US 8,687,971 B2
(45) Date of Patent: Apr. 1, 2014

(54) SYSTEM, LASER-ON-CMOS CHIP, AND METHOD FOR SETTING A WAVELENGTH TO BE USED BY THE LASER-ON-CMOS CHIP

(75) Inventor: Stefan Dahlfort, Santa Clara, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 370 days.

(21) Appl. No.: 13/017,166

(22) Filed: Jan. 31, 2011

(65) Prior Publication Data

US 2012/0195599 A1    Aug. 2, 2012

(51) Int. Cl.
*H04B 10/12*    (2011.01)
*H04B 10/00*    (2013.01)
*G02B 6/12*    (2006.01)
*G02B 6/42*    (2006.01)
*G02B 6/26*    (2006.01)

(52) U.S. Cl.
USPC ............ 398/142; 398/141; 398/154; 385/14; 385/15; 385/31; 385/39; 385/47

(58) Field of Classification Search
USPC .......... 398/142, 141, 154; 385/14, 15, 31, 39, 385/47
See application file for complete search history.

(56) References Cited

U.S. PATENT DOCUMENTS

| 5,216,682 | A  * | 6/1993 | Hedberg | 372/31 |
| 7,961,992 | B2 * | 6/2011 | De Dobbelaere et al. | 385/14 |
| 2002/0067882 | A1 * | 6/2002 | Guilfoyle | 385/24 |
| 2002/0076480 | A1 * | 6/2002 | Hsieh et al. | 427/8 |
| 2004/0042448 | A1 * | 3/2004 | Lebizay et al. | 370/362 |
| 2006/0173125 | A1 * | 8/2006 | Lawson et al. | 524/571 |
| 2007/0165688 | A1 * | 7/2007 | Lee et al. | 372/71 |
| 2008/0013880 | A1 * | 1/2008 | Pitwon | 385/14 |
| 2008/0019694 | A1 * | 1/2008 | Song et al. | 398/72 |
| 2008/0089692 | A1 * | 4/2008 | Sorin | 398/135 |
| 2008/0107374 | A1 * | 5/2008 | Bozso et al. | 385/14 |
| 2009/0310922 | A1 * | 12/2009 | Sasaki | 385/89 |
| 2010/0006784 | A1 * | 1/2010 | Mack et al. | 250/551 |
| 2010/0329607 | A1 * | 12/2010 | Drost et al. | 385/37 |
| 2011/0013911 | A1 * | 1/2011 | Alexander et al. | 398/79 |
| 2012/0033295 | A1 * | 2/2012 | Presi et al. | 359/344 |
| 2012/0134669 | A1 * | 5/2012 | Xu et al. | 398/38 |

FOREIGN PATENT DOCUMENTS

| WO | WO 2010/025767 | A1 |  | 3/2010 |  |
| WO | WO 2010025767 | A1 | * | 3/2010 | ............ H04B 10/26 |
| WO | WO 2010/064999 | A1 |  | 6/2010 |  |
| WO | WO 2011/134536 | A1 |  | 11/2011 |  |

OTHER PUBLICATIONS

Adithyaram Narasimha et al. "An ultra low power CMOS photonics technology platform for H/S optoelectronic transceivers at less that $1 per Gbps." Optical Fiber Communication (OFC). Mar. 21, 2010. Collocated National Fiber Optic Engineers Conference, 2010 Conference on (OFC/NFOEC), IEEE, Piscataway, NJ, USA. XP031676816.

(Continued)

*Primary Examiner* — Ken Vanderpuye
*Assistant Examiner* — Abbas H Alagheband (57) ABSTRACT

A system, a Laser-on-CMOS chip, and a method are described herein in accordance with the present invention. In one embodiment, the present invention enables a conventional WDM-capable system to dictate what wavelengths a Laser-on-CMOS chip's optical ports will use by seeding each of their LoC upstream reflective light generation devices (e.g., RSOAs) with a particular wavelength.

17 Claims, 4 Drawing Sheets

(56) References Cited

OTHER PUBLICATIONS

Chen. Roger, et al. As-Grown InGaAs Nanolasers for Integrated Silicon Photonics. PDIWI2, Photonics in Switching, Monterey, 2010.

Ma, R.M. et al. Room Temperature Nano-Square Plasmon Laser, PDIWI4, Photonics in Switching, Monterey, 2010.

IBM Research. Silicon Integrated Nanophotonics. Retrieved from Internet: http://domino.research.ibm.com/comm/research_projects.nsf/pages/photonics.index.html. Dec. 12, 2010.

Intel. Moving Data With Silicon and Light. Retrieved from Internet: http://techresearch.intel.com/ResearchAreadetails.aspx?Id=26. 2010.

Wikipedia, Silicon Photonics. Retrieved from Internet: http://en.wikipedia.org/wiki/Silicon_photonics.

* cited by examiner

SYSTEM, LASER-ON-CMOS CHIP, AND METHOD FOR SETTING A WAVELENGTH TO BE USED BY THE LASER-ON-CMOS CHIP

TECHNICAL FIELD

The present invention relates to a system, a Laser-on-CMOS chip, and a method for setting a wavelength to be used by an optical port on the Laser-on-CMOS chip. In one embodiment, the present invention enables a conventional WDM-capable system to dictate what wavelengths a Laser-on-CMOS chip's optical ports will use by seeding each of their LoC upstream reflective light generation devices (e.g., RSOAs) with a particular wavelength.

BACKGROUND

The following abbreviations are herewith defined, at least some of which are referred to within the following description of the prior art and the present invention.
AWG Arrayed Waveguide Grating
CMOS Complementary Metal-Oxide-Semiconductor
FTTB/C Fiber-to-the-Building/Cabinet
FTTH Fiber-to-the-Home
IRZ Inverted Return to Zero (modulation)
LoC Laser-on-CMOS
ONU Optical Network Units
PON Passive Optical Network
Rx Receiver
RZ Return to Zero (modulation)
PIN Positive Intrinsic Negative (photo detector)
TDM Time Division Multiplexing
TRx Transceiver
TTF Thin-Film Filter
Tx Transmitter
VCSEL Vertical Cavity Surface Emitting Laser
WDM Wavelength Division Multiplexing It has long been anticipated that conventional integrated electrical circuits (chips) based on CMOS (complementary metal-oxide-semiconductor) will eventually contain light emitting transmitters. This highly desired function, being part of the wider silicon photonics area, would remove the bottleneck of chip-to-chip communication resulting from electrical signaling, which is limited in distance and bit-rate.

Recently, several research groups, both from universities and device manufacturers have demonstrated various ways of enabling light generation with CMOS compatible materials. The most promising approaches for low cost and direct integration of light emitting transmitters on CMOS chips, involve producing lasers directly on silicon. See, R. Chen, et al. "As-Grown InGaAs Nanolasers for Integrated Silicon Photonics", PDIWI2, Photonics in Switching, Monterey, 2010 (the contents of this document are incorporated herein by reference). This way, conventional fiber optics could be attached to the CMOS chip (e.g., laser being part of the chip package) hence enabling flexible chip-to-chip communication on the same board, between boards, between chassis etc. This concept could be termed Laser-on-CMOS (LoC).

The above envisioned LoC would enable extreme flexibility and low cost in short reach communications or intra-site communications (i.e. chip-to-chip, board-to-board, system-to-system) over parallel fibers for full duplex communication between optical ports. In these types of intra-site communications it may be desirable to reduce the number of fibers used since more fibers means more connectors and in general more cost due to the handling of fibers and the space taken-up by the fibers. Hence, there is a need to enable intra-site communications where only one fiber instead of parallel fibers are used for full duplex communication between optical ports. This need and other needs are satisfied by the present invention.

In another application which involves longer reach communications or inter-site communications (i.e., between buildings, central offices, data centers) there is typically a limited number of fibers that are available between the sites. Thus, wavelength division multiplexing (WDM) is often utilized to fit more channels into the same fiber. However, if the above envisioned LoC is used in this application then this would require the LoC to be WDM-capable. This requirement would firstly much complicate and increase the cost of such LoC chips as well as limit the flexibility as the color of each laser would have to be pre-determined. Techniques involving the use of tunable lasers exist but it is also likely to increase the complexity and cost. Hence, there is a need to enable inter-site communications where the LoC is WDM-capable but without the aforementioned shortcomings associated with the increased cost, the increased complications, and the limited flexibility. This need and other needs are satisfied by the present invention.

SUMMARY

A system, a Laser-on-CMOS chip, and a method for setting a wavelength to be used by an optical port on the Laser-on-CMOS chip are described in the independent claims of the present application. Advantageous embodiments of the system, the Laser-on-CMOS chip, and the method are described in the dependent claims.

In an aspect, the present invention provides a system comprising: (a) a first system with at least one optical port, each optical port comprising a downstream optical transmitter configured to generate an IRZ line coded downstream data signal, and an upstream optical receiver configured to receive a RZ line coded upstream data signal; (b) a Laser-on-CMOS chip with at least one optical port, each optical port comprising a downstream optical receiver configured to receive a first portion of the IRZ line coded downstream data signal, and an upstream reflective light generating device configured to receive a second portion of the IRZ line coded downstream data signal and use pulses in the IRZ line coded downstream data signal and a RZ encoded electronic data signal to modulate and transmit the RZ line coded upstream data signal such that the IRZ line coded downstream data signal optically seeds the RZ line coded upstream data signal resulting in both the IRZ line coded downstream data signal and the RZ line coded upstream data signal each having a same wavelength; and (c) an optical fiber coupled between the first system and the Laser-on-CMOS chip and configured to transmit the IRZ line coded downstream data signal and the RZ line coded upstream data signal therebetween. The system has an advantage in that the first system's downstream optical transmitters dictate what wavelengths that the Laser-on-CMOS chip's optical ports will use by seeding (stimulating) each of their upstream reflective light generating devices (e.g., RSOAs) with to a particular wavelength.

In another aspect, the present invention provides a Laser-on-CMOS chip that has at least one integrated optical port, each optical port comprising: (a) a downstream optical receiver configured to receive a first portion of a IRZ line coded downstream data signal: and (b) an upstream reflective light generating device configured to receive a second portion of the IRZ line coded downstream data signal and use pulses in the IRZ line coded downstream data signal and a RZ encoded electronic data signal to modulate and transmit a RZ line coded upstream data signal such that the IRZ line coded downstream data signal optically seeds the RZ line coded upstream data signal resulting in both the IRZ line coded downstream data signal and the RZ line coded upstream data signal each having a same wavelength. The Laser-on-CMOS chip has an advantage in that a remote device dictates what wavelengths that the integrated optical ports will use by seeding (stimulating) each of their upstream reflective light generating devices (e.g., RSOAs) with a particular wavelength.

In yet another aspect, the present invention provides a method for setting a wavelength to be used by an optical port integrated on a Laser-on-CMOS chip. The method implemented by the Laser-on-CMOS chip comprises the steps of: (a) receiving at the optical port an IRZ line coded downstream data signal; (b) modulating a RZ line coded upstream data signal using pulses in the IRZ line coded downstream data signal and a RZ encoded electronic data signal; and (c) transmitting from the optical port the RZ line coded upstream data signal, wherein the IRZ line coded downstream data signal and the RZ line coded upstream data signal each have a same wavelength. The method has an advantage in that a remote device dictates what wavelength is to be used by the optical port on the Laser-on-CMOS chip.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
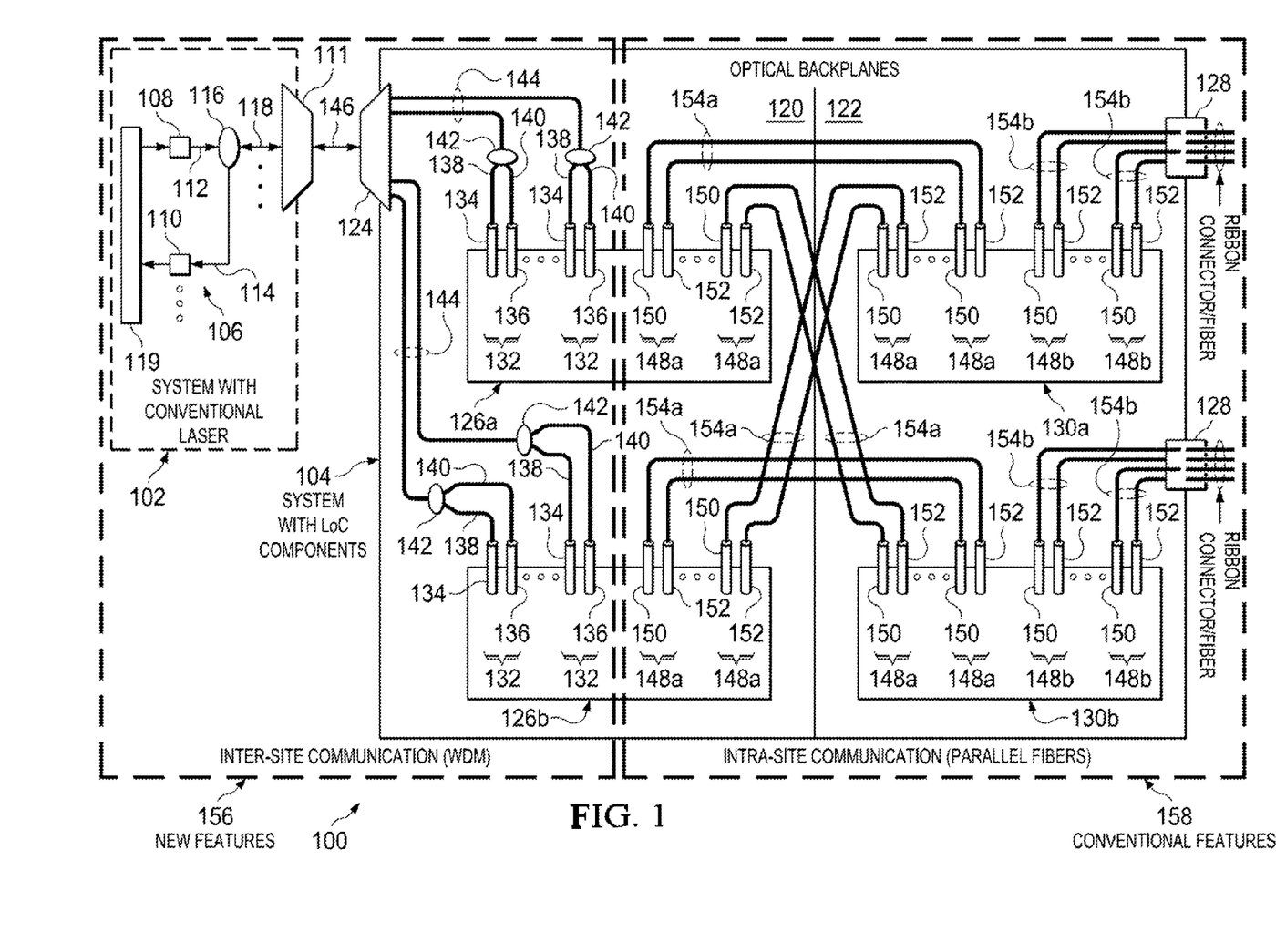
FIG. 1 is a block diagram illustrating an exemplary system including a WDM-capable system and a WDM-capable LoC system which are coupled to one another in accordance with an embodiment of the present invention.

Referring to FIG. 1, there is shown a block diagram illustrating an exemplary system 100 including a WDM-capable system 102 and a WDM-capable LoC system 104 coupled to one another in accordance with an embodiment of the present invention. In one example, the WDM-capable system 102 includes multiple optical ports 106 where each In optical port 106 includes a Tx 108 (e.g., conventional laser 108, downstream optical transmitter 108) and a Rx 110 (e.g., upstream optical receiver 110, detector 110). The multiple optical ports 106 are coupled to a WDM multiplexer 111. In this example, each optical port's Tx 108 and Rx 110 have connected thereto optical fibers 112 and 114 which are connected to an optical power coupler 116 which is coupled to a single fiber 118 which is connected to the WDM multiplexer 111. The WDM-capable system 102 also includes a MAC 119 which interfaces with the optical ports 106 to control what is transmitted from the multiple Tx's 108 and decode what is received by the multiple Rx's 110.

The WDM-capable LoC system 104 has two optical backplanes 120 and 122 where on the first optical backplane 120 there is positioned a WDM multiplexer 124 and two LoC chips 126a and 126b while on the second optical backplane 122 there is positioned a ribbon connector 128 and two LoC chips 130a and 130b. The two LoC chips 126a and 126b have multiple optical ports 132 integrated (grown) thereon each including a Tx 134 (e.g., upstream reflective light generating device 134, LoC light generating device 134, RSOA 134) and a Rx 136 (e.g., downstream optical receiver 136, PIN 136, detector 136). In this example, the optical port's Tx 134 and Rx 136 each have connected thereto optical fibers 138 and 140 which are connected to an optical power coupler 142 which is coupled to a single fiber 144 which is connected to the WDM multiplexer 124. The two WDM multiplexers 111 and 124 are coupled to one another by a single optical fiber 146. The LoC chips 126a, 126b, 130a and 130b also have multiple optical ports 148a and 148b integrated (grown) thereon where each optical port 148a and 148b includes a Tx 150 (e.g., downstream optical transmitter 150) and a Rx 152 (e.g., upstream optical receiver 152, detector 152). As shown, the optical ports 148a are coupled to one another via pairs of optical fibers 154a while optical ports 148b are coupled to the ribbon connector 128 via pairs of optical fibers 154b.

The exemplary system 100 has both new features (see left side indicated by box 156) and conventional features (see right side indicated by box 158). The conventional features relate to short reach backplane or intra-site communications which entail the use of conventional optical ports 148a and 148b (see FIG. 3 for a discussion on how the present invention can be used to implement these types of intra-site communications). In contrast, the new features relate to long reach or inter-site communications where the WDM-capable system 102 dictates what WDM colors (wavelengths) the LoC system's optical ports 132 will use by seeding each of their LoC upstream reflective light generation devices 134 (e.g., RSOA 134) with a particular wavelength in accordance with the present invention. A detailed discussion about how the new feature can be implemented is provided below with respect to FIG. 2.

Figure 2:
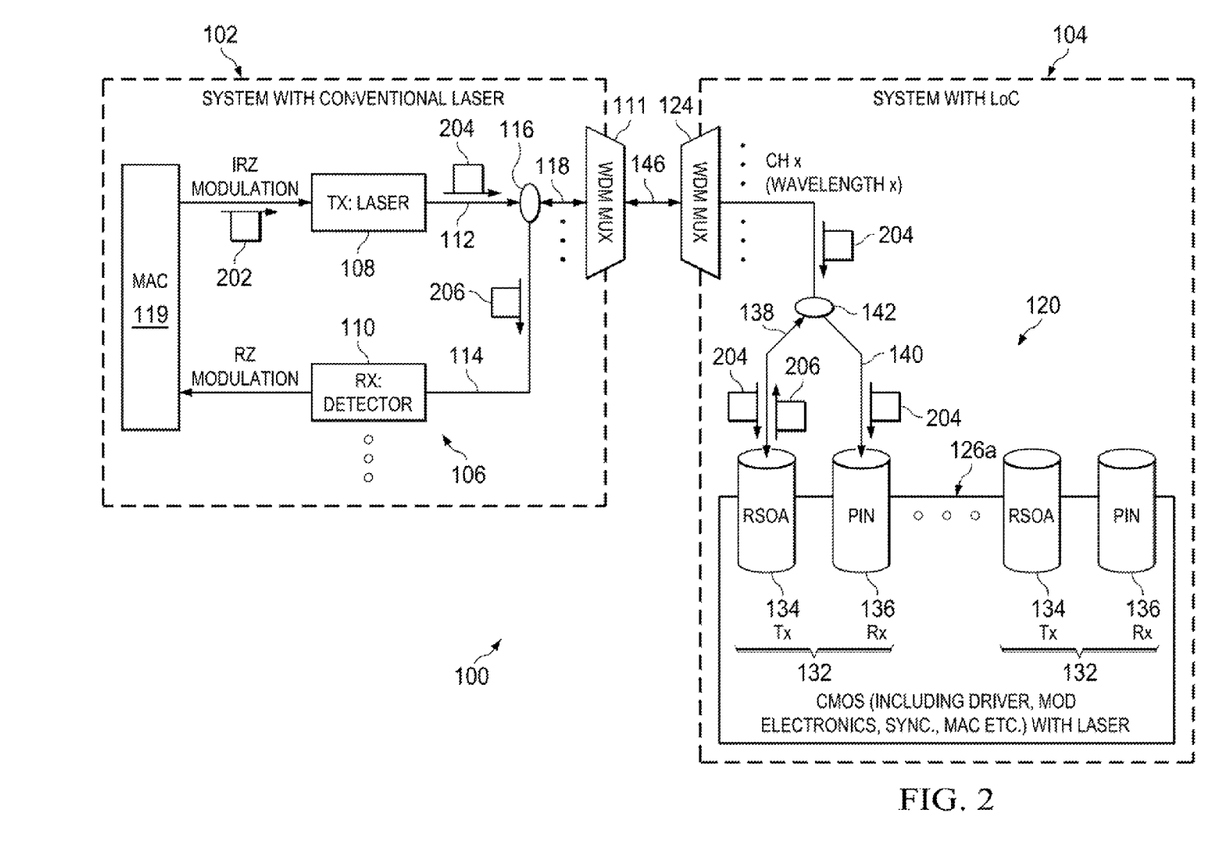
FIG. 2 is a block diagram illustrating in greater detail portions of the exemplary system shown in FIG. 1 which is used to help explain how the WDM-capable system sets the wavelengths to be used by optical ports in the WDM-capable LoC system in accordance with an embodiment of the present invention.

Referring to FIG. 2, there is shown a block diagram illustrating in greater detail the new features of the exemplary system 100 namely the WDM-capable system 102 and the WDM-capable LoC system 104 (including the WDM multiplexer 124, the optical backplane 120, the LoC chip 126a, the optical port 132, and the coupler 142) in accordance with an embodiment of the present invention. As shown, the LoC chip 126a includes multiple optical ports 132 (two shown) where each optical port 132 includes the Tx 134 which is a reflective light generating device (e.g., RSOA) and the Rx 136 which is a downstream optical receiver (e.g., PIN). In operation, the RSOA 134 is seeded (stimulated) by the conventional laser 108 at the other end of the WDM communication link. In particular, the conventional laser 108 dictates what wavelength the LoC optical port 132 uses to transmit and receive data. In this way, each LoC optical port 132 will have a distinct wavelength to transmit and receive data to the corresponding optical port 106 in the WDM-capable system 102.

In operation, the WDM-capable system 102 sets the wavelengths used by the LoC optical ports 132 for example by using the modulation concept described in the co-assigned PCT Patent Application Publication Number WO 2010/025767 A1 (the contents of which are incorporated by reference herein). In particular, the WDM-capable system's MAC 119 sends an IRZ signal 202 to modulate the conventional laser 108 (typically direct modulation for low cost applications or by an external modulator for high bitrates). The conventional laser 108 generates the corresponding optical IRZ signal 204 on a certain wavelength which is multiplexed along with other optical IRZ signals (from other optical ports 106) by the WDM multiplexer 111 and transmitted over the signal optical fiber 146 to the WDM-capable LoC system's WDM multiplexer 124. The LoC chip 126a receives the de-multiplexed optical IRZ signal 204 and the optical power coupler 142 couples part of the received light to the Rx 136 (e.g., optical detector, PIN) which converts the optical IRZ signal 204 into an electrical signal which is then passed on to the CMOS electronics on the LoC chip 126a. The TX 134 which is integrated on the LoC chip 126a receives the remaining light of the optical IRZ signal 204 from the optical power coupler 142. The TX 134 makes use of the remaining optical IRX signal 204 to modulate a return optical signal 206 with RZ pulses shifted a half bit slot with respect to the received optical IRZ signal 204. Thus, the return wavelength of the return optical RZ signal 206 is exactly the same as the wavelength of the received optical IRZ signal 204, i.e., the LoC is WDM-enabled. And, the return optical RZ signal 206 can be multiplexed with return optical RZ signals (from other optical ports 132) by the WDM multiplexer 124 and sent back over single fiber 146 to the WDM-capable system 102. The LoC chip 126a has CMOS electronics including a signal synchronizer that interleaves the RZ signal 206 by a half bit slot shift with respect to the incoming IRZ signal 204. The CMOS electronics also perform the drive, bias and modulation of the TX 134. The modulation data for the RSOA 134 comes from the Tx part of the MAC function implemented by the CMOS electronics in the LoC chip 126a. The result of this architecture is that only one fiber 146 is needed for full duplex (bidirectional) optical transmission between the WDM-capable system 102 and the WDM-capable LoC system 104.

The LoC optical ports 132 used for WDM communication (by wavelength re-use seeding) and in particular the RSOA 134 should have an interface to the fiber 138 which has very low reflectance to enable the RSOA like operation. For this, techniques like anti-reflection coating on the LoC light generating device can be used. Another technique than can be used in combination with the anti-reflection coating involves the use of angled fiber ends which would help to further reduce the reflectivity between the RSOA 134 and the fiber 138. In contrast, the LoC optical ports 148a and 148b not being WDM enabled would require higher reflectivity for lasing operation, which is intrinsically achieved when connecting to the fibers 154a and 154b.

The WDM-capable LoC system 104 uses a passive WDM multiplexer 124 as an interface to the inter-site link (e.g., card front plate). The passive WDM multiplexer 124 can utilize technologies that include thin-film filter (TFF) or arrayed waveguide grating (AWG) for higher WDM channel counts. The WDM multiplexer 124 can be pluggable to the system fronts and connected to one or more LoC chips 126a and 126b (two shown) which have a varying number of optical ports 132 for full flexibility.

Referring again to FIG. 1, the conventional features (see right side indicated by box 158) which relate to short reach backplane or intra site communications entailed the use of conventional optical ports 148a and 148b. However, the present invention can be utilized to convert these conventional features to new features such that the use of two fibers 154a or 154b for each optical port 148a and 148b is not required but instead one optical fiber can be associated with each optical port 148a and 148b to enable full duplex communications. A detailed discussion about an exemplary LoC chip-to-LoC chip architecture (or LoC board-to-LoC board architecture) which supports IRZ/RZ communication (i.e. re-modulation) with and without WDM in accordance with another embodiment of the present invention is provided below with respect to FIG. 3.

Figure 3:
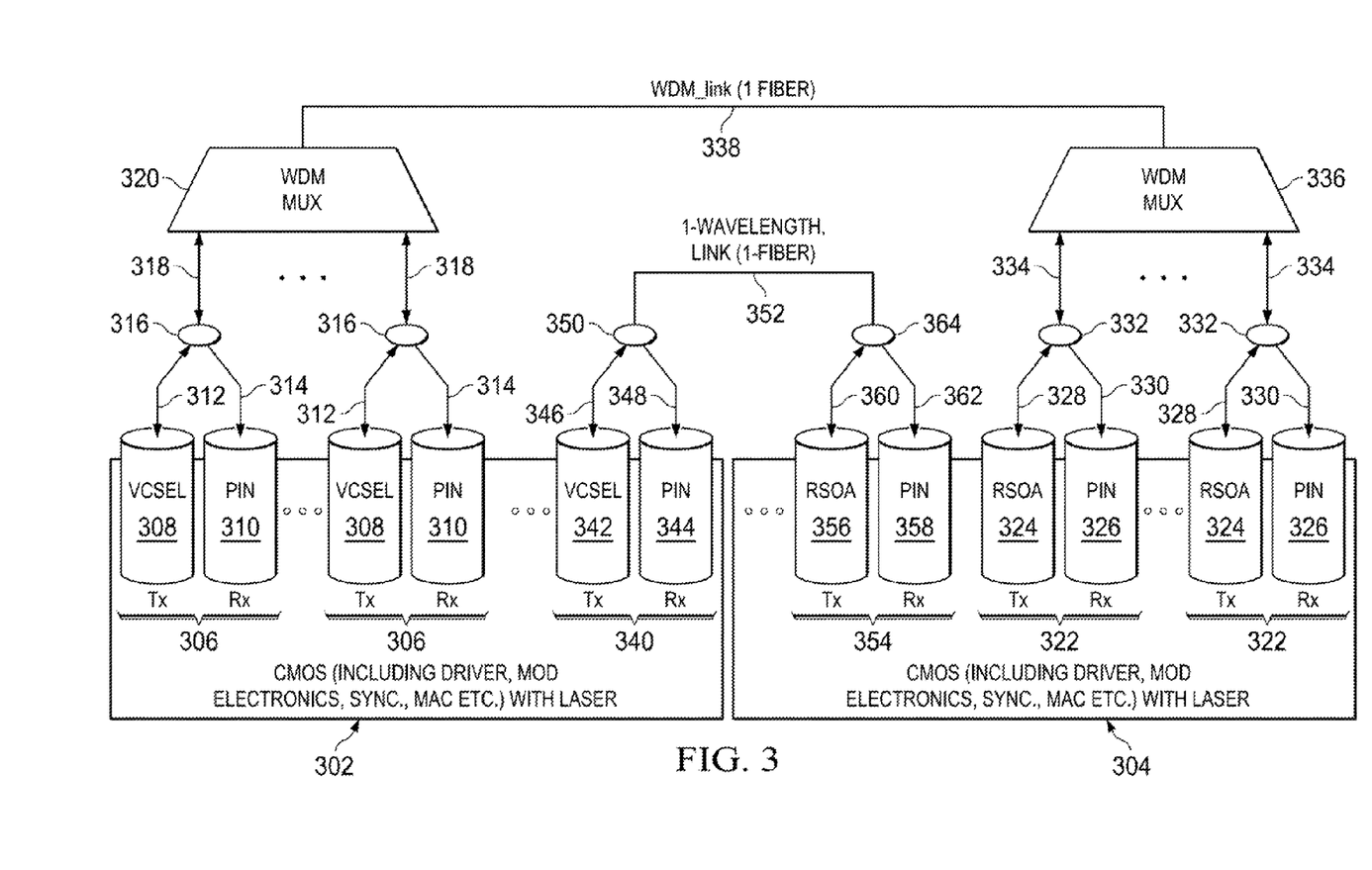
FIG. 3 is a block diagram illustrating an exemplary LoC chip-to-LoC chip architecture which is used to help explain how one LoC chip sets the wavelengths used by optical ports on the second LoC chip in accordance with another embodiment of the present invention.

Referring to FIG. 3, there is shown a block diagram illustrating an exemplary intra-site architecture including a first LoC chip 302 and a second LoC chip 304 which support IRZ/RZ communication (i.e. re-modulation) with and without WDM in accordance with another embodiment of the present invention. In this example, the LoC chip 302 has multiple optical ports 306 integrated (grown) thereon each including a Tx 308 (e.g., conventional laser 308, downstream optical transmitter 308, VCSEL 308) and a Rx 310 (e.g., downstream optical receiver 310, PIN 310, detector 310). As shown, the optical port's Tx 308 and Rx 310 each have connected thereto optical fibers 312 and 314 which are connected to an optical power coupler 316 which is coupled to a single fiber 318 which is connected to a WDM multiplexer 320. In contrast, the LoC chip 304 has multiple optical ports 322 integrated (grown) thereon each including a Tx 324 (e.g., upstream reflective light generating device 324, LoC light generating device 324, RSOA 324) and a Rx 326 (e.g., downstream optical receiver 326, PIN 326, detector 326). As shown, the optical port's Tx 324 and Rx 326 each have connected thereto optical fibers 328 and 330 which are connected to an optical power coupler 332 which is coupled to a single fiber 334 connected to a WDM multiplexer 336. The two WDM multiplexers 320 and 336 are coupled to one another by a single optical fiber 338. As described above with respect to the example shown in FIG. 2, the optical ports 306 and in particular the conventional lasers 308 dictate what WDM colors the optical ports 322 will use by seeding each of their LoC upstream reflective light generation devices 324 (e.g., RSOAs 324) with a particular wavelength in accordance with the present invention. Each pair of optical ports 306 and 322 will have their own unique wavelength. If desired, the LoC chips 302 and 304 may have both VCSELs 308 and RSOAs 324 used thereon rather than just VCSELs 308 or RSOAs 324 as shown.

In addition (or alternatively), the LoC chip 302 can have one or more optical ports 340 (one shown) integrated (grown) thereon each including a Tx 342 (e.g., conventional laser 342, downstream optical transmitter 342, VCSEL 342) and a Rx 344 (e.g., downstream optical receiver 344, PIN 344). The optical port's Tx 342 and Rx 344 each have connected thereto optical fibers 346 and 348 which are connected to an optical power coupler 350 which is coupled to a single fiber 352. In contrast, the LoC chip 304 has one or more optical ports 354 (one shown) integrated (grown) thereon each including a Tx 356 (e.g., upstream reflective light generating device 356, LoC light generating device 356, RSOA 356) and a Rx 358 (e.g., downstream optical receiver 358, PIN 358, detector 358). The optical port's Tx 356 and Rx 358 each have connected thereto optical fibers 360 and 362 which are connected to an optical power coupler 364 which is coupled to the single fiber 352. The single fiber 352 connects the LoC chip 302 to the LoC chip 304. As described above with respect to the example shown in FIG. 2, the optical port 340 and in particular the conventional lasers 342 dictates what WDM color the optical port 354 will use by seeding the LoC upstream reflective light generation device 356 (e.g., RSOA 356) with a particular wavelength in accordance with the present invention. In the single-wavelength case, WDM would not strictly be used because both communication directions would use the same wavelength, however the gain would be that only one fiber is required for a full duplex communication link as opposed to the two parallel fibers 154a or 154b which where needed in FIG. 1's conventional feature 158.

The same architecture described above with respect to the LoC chip-to-LoC chip can be applied to board-to-board communications. Furthermore, the LoC chip-to-LoC chip application where one fiber 338 or 352 is used instead of parallel fibers would mean that new components such as the optical power couplers 316, 332, 350 and 364, and WDM multiplexers 320 and 336 would need to be integrated on the CMOS system. However, this can be done for a low cost when compared to having to make room and route parallel fibers for each optical port. If desired, the optical power couplers 142, 316, 332, 350 and 364 could be integrated (grown) on CMOS rather than being connected to the LoC chips 126a, 126b, 302 and 304.

Figure 4:
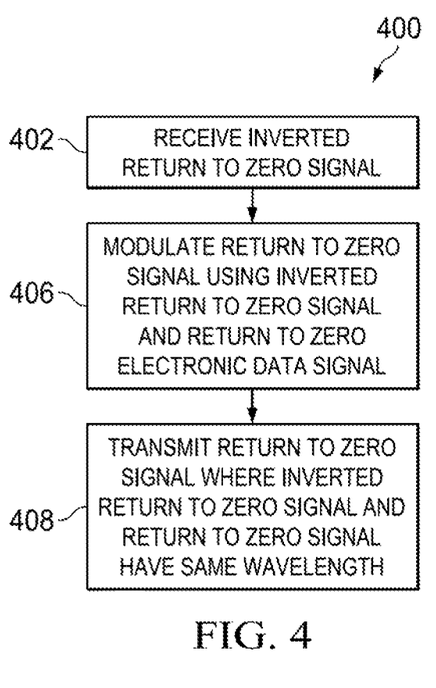
FIG. 4 is a flowchart illustrating the basic steps of a method for setting a wavelength to be used by an optical port on a Laser-on-CMOS chip in accordance with an embodiment of the present invention.

Referring to FIG. 4, there is a flowchart illustrating the basic steps of a method 400 for setting a wavelength to be used by an optical port integrated on a Laser-on-CMOS chip in accordance with an embodiment of the present invention. Beginning at step 402, the Laser-on-CMOS chip's optical port (e.g., optical port 132, 322, or 354) receives an inverse-return-to-zero line coded downstream data signal. At step 404, the Laser-on-CMOS chip modulates a return-to-zero line coded upstream data signal using pulses in the inverse-return-to-zero line coded downstream data signal and a return-to-zero encoded electronic data signal. At step 406, the Laser-on-CMOS chip's optical port transmits the return-to-zero line coded upstream data signal, wherein the inverse-return-to-zero line coded downstream data signal and the return-to-zero line coded upstream data signal each have a same wavelength.

From the foregoing, one skilled in the art will appreciate that the present invention enables a remote inter-site conventional WDM-capable system 102 (see FIGS. 1-2) or conventional intra-site optical ports (see FIG. 3) to dictate what wavelengths a LoC system's optical ports will use by seeding each of their LoC upstream reflective light generation devices (e.g., RSOAs) with a particular wavelength. In the WDM embodiment, the LoC would be color-less and have reflective light generating functionality at its transmitting optical ports, e.g. a reflective semiconductor optical amplifier (RSOA). At the other side of the communication link, conventional DWDM transmitters (integrated in arrays if many channels are required from one system or discrete lasers where if only a few channels are needed from each system) could be used to dictate what wavelengths the LoC would use, i.e. each laser at the conventional side would seed (stimulate) each LoC upstream reflective light generating source resulting in the LoC system having WDM-capability (see discussion related to FIGS. 1-2). As a result, the present invention enables low cost and power consumption WDM communication between CMOS chips for inter-site applications. Plus, the required WDM multiplexing of the LoC system is completely passive and enables flexibility in the number of LoC optical ports attached, channels used etc. In the intra-site application, the present invention enables only one fiber to be used instead of parallel fibers to allow full duplex communication between optical ports in LoC chips, LoC boards etc. . . . (see discussion related to FIG. 3). The types of systems and applications that are suitable for the LoC approach of the present invention include (for example): ultra low cost PON ONUs (FTTH, FTTB/C), edge routers, aggregation switches, cross-connects etc.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A system comprising:
a first system with at least one optical port, each optical port is associated with a downstream optical transmitter and an upstream optical receiver;
a Laser-on-CMOS (complementary metal-oxide-semiconductor) chip with at least one integrated optical port, each integrated optical port is associated with a downstream optical receiver and an upstream reflective light generating device, wherein the at least one downstream optical transmitter of the first system dictates what wavelength the corresponding at least one integrated optical port of the Laser-on-CMOS chip uses to transmit and receive data; and
an optical fiber coupled between the first system and the Laser-on-CMOS chip;
the first system comprises multiple optical ports coupled via multiple optical fibers to a wavelength division multiplexing (WDM) multiplexer, and the Laser-on-CMOS chip comprises multiple integrated optical ports coupled via multiple optical fibers to a WDM multiplexer, wherein the optical fiber is coupled between the WDM multiplexers; and
the Laser-on-CMOS chip is part of an edge router, an aggregation switch, or a cross-connect.

2. The system of claim 1, wherein the upstream reflective light generating device was grown on CMOS material of the Laser-on-CMOS chip.

3. The system of claim 1, wherein the downstream optical receiver of the Laser-on-CMOS chip is a positive intrinsic negative (PIN) photo detector.

4. A Laser-on-CMOS (complementary metal-oxide-semiconductor) chip which enables wavelength division multiplexing (WDM) communications with a first system, the Laser-on-CMOS chip comprising:
at least one integrated optical port, each optical port associated with:
a downstream optical receiver configured to receive a first portion of an inverse-return-to-zero line coded downstream data signal;
an upstream reflective light generating device configured to receive a second portion of the inverse-return-to-zero line coded downstream data signal and use pulses in the inverse-return-to-zero line coded downstream data signal and a return-to-zero encoded electronic data signal to modulate and transmit a return-to-zero line coded upstream data signal such that the inverse-return-to-zero line coded downstream data signal optically seeds the return-to-zero line coded upstream data signal resulting in both the inverse-return-to-zero line coded downstream data signal and the return-to-zero line coded upstream data signal each having the same wavelength; and the Laser-on-CMOS chip is part of an edge router, an aggregation switch, or a cross-connect.

5. The Laser-on-CMOS chip of claim 4, wherein the upstream reflective light generating device was grown on CMOS material of the Laser-on-CMOS chip.

6. The Laser-on-CMOS chip of claim 4, wherein the reflective semiconductor optical amplifier has a fiber interface with an anti-reflective coating thereon.

7. The Laser-on-CMOS chip of claim 4, wherein the downstream optical receiver is a positive intrinsic negative (PIN) photo detector.

8. The Laser-on-CMOS chip of claim 4, further comprises a signal synchronizer that interleaves the return-to-zero line coded upstream data signal by one-half bit with respect to the incoming inverse-return-to-zero line coded downstream data signal.

9. A method for enabling wavelength division multiplexing (WDM) communications with a first system by setting a wavelength to be used by an optical port integrated on a Laser-on-CMOS (complementary metal-oxide-semiconductor) chip, the method implemented by the Laser-on-CMOS chip comprising the steps of:
receiving, at the optical port, an inverse-return-to-zero line coded downstream data signal;
modulating a return-to-zero line coded upstream data signal using pulses in the inverse-return-to-zero line coded downstream data signal and a return-to-zero encoded electronic data signal;
transmitting, from the optical port, the return-to-zero line coded upstream data signal, wherein the inverse-return-to-zero line coded downstream data signal and the return-to-zero line coded upstream data signal each have a same wavelength; and
wherein the Laser-on-CMOS chip is part of an edge router, an aggregation switch, or a cross-connect.

10. The method of claim 9, further comprising a step of interleaving the return-to-zero line coded upstream data signal by one-half bit with respect to the incoming inverse-return-to-zero line coded downstream data signal.

11. The method of claim 9, wherein a reflective semiconductor optical amplifier receives the inverse-return-to-zero line coded downstream data signal and transmits the return-to-zero line coded upstream data signal.

12. The method of claim 9, wherein the reflective semiconductor optical amplifier has a fiber interface with an anti-reflective coating thereon.

13. The system of claim 1, further comprising:
the first system with the at least one optical port, each optical port associated with the downstream optical transmitter configured to generate an inverse-return-to-zero line coded downstream data signal, and to the upstream optical receiver configured to receive a return-to-zero line coded upstream data signal;
the Laser-on-CMOS chip with the at least one integrated optical port, each integrated optical port associated with the downstream optical receiver configured to receive a first portion of the inverse-return-to-zero line coded downstream data signal, and to the upstream reflective light generating device configured to receive a second portion of the inverse-return-to-zero line coded downstream data signal and use pulses in the inverse-return-to-zero line coded downstream data signal and a return-to-zero encoded electronic data signal to modulate and transmit the return-to-zero line coded upstream data signal such that the inverse-return-to-zero line coded downstream data signal optically seeds the return-to-zero line coded upstream data signal resulting in both the inverse-return-to-zero line coded downstream data signal and the return-to-zero line coded upstream data signal each having the same wavelength;
the optical fiber coupled between the first system and the Laser-on-CMOS chip and configured to transmit the inverse-return-to-zero line coded downstream data signal and the return-to-zero line coded upstream data signal therebetween; and
the Laser-on-CMOS chip further comprises a signal synchronizer that interleaves the return-to-zero line coded upstream data signal by one-half bit with respect to the incoming inverse-return-to-zero line coded downstream data signal.

14. The system of claim 13, wherein the upstream reflective light generating device was grown on CMOS material of the Laser-on-CMOS chip.

15. The system of claim 13, wherein the reflective semiconductor optical amplifier has a fiber interface with an anti-reflective coating thereon.

16. The system of claim 13, wherein the downstream optical receiver which is configured to receive the first portion of the inverse-return-to-zero line coded downstream data signal is a positive intrinsic negative (PIN) photo detector.

17. The system of claim 13, wherein:
the first system comprises multiple optical ports coupled via multiple optical fibers to the WDM multiplexer; and
the Laser-on-CMOS chip comprises multiple optical ports coupled via multiple optical fibers to the WDM multiplexer, wherein the optical fiber is coupled between the WDM multiplexers, wherein the multiple optical ports of the first system and the multiple optical ports of the Laser-on-CMOS chip have pairs of optical ports operating at the same wavelengths, and wherein each pair of the optical ports operate at a different wavelength than the other pairs of the optical ports.

* * * * *

UNITED STATES PATENT AND TRADEMARK OFFICE
CERTIFICATE OF CORRECTION

PATENT NO. : 8,687,971 B2  
APPLICATION NO. : 13/017166  
DATED : April 1, 2014  
INVENTOR(S) : Dahlfort Page 1 of 1

It is certified that error appears in the above-identified patent and that said Letters Patent is hereby corrected as shown below:

In the Specification

In Column 2, Line 59, delete "to a" and insert -- a --, therefor.

In Column 3, Line 67, delete "In optical" and insert -- optical --, therefor.

In Column 5, Line 27, delete "IRX" and insert -- IRZ --, therefor.

Signed and Sealed this
Twenty-sixth Day of August, 2014

Michelle K. Lee
*Deputy Director of the United States Patent and Trademark Office*